United States Patent [19]

Matsumoto

[11] Patent Number: 4,832,099

[45] Date of Patent: May 23, 1989

[54] PNEUMATIC RADIAL-TIRE WITH GROOVES OF VARYING CROSS SECTION

[75] Inventor: Hiroyuki Matsumoto, Tachikawa, Japan

[73] Assignee: Bridgestone Corporation, Tokyo, Japan

[21] Appl. No.: 63,046

[22] Filed: Jun. 17, 1987

[30] Foreign Application Priority Data

Mar. 11, 1987 [JP] Japan .................................. 62-55669

[51] Int. Cl.$^4$ ............................................. B60C 11/04
[52] U.S. Cl. ................................................. 152/209 R
[58] Field of Search ............. 152/209 R, 209 B, 209 D

[56] References Cited

U.S. PATENT DOCUMENTS

| | | | |
|---|---|---|---|
| 4,057,089 | 11/1977 | Johannsen | 152/209 R |
| 4,177,850 | 12/1979 | Ogawa et al. | 152/209 R |
| 4,284,115 | 8/1981 | Ohnishi | 152/209 R |
| 4,299,264 | 11/1981 | Williams | 152/209 R |
| 4,574,856 | 3/1986 | Graas | 152/209 R |
| 4,632,166 | 12/1986 | Fontaine et al. | 152/209 R |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

An improved pneumatic tire having a high cornering performance on a wet road as well as a high wandering performance and a wear resistivity is disclosed, which comprises a tread with a plurality of grooves which open to the axially outer edge or edges of the tread, the center line in a cross section of each of the grooves at least in the tread edge portion being axially inwardly inclined with respect to a vertical line perpendicular to the surface of the tread and the angle "H" between the center line and the vertical line being gradually increased as the position of the cross section is away from the equator plane of the tire.

2 Claims, 10 Drawing Sheets

FIG_1
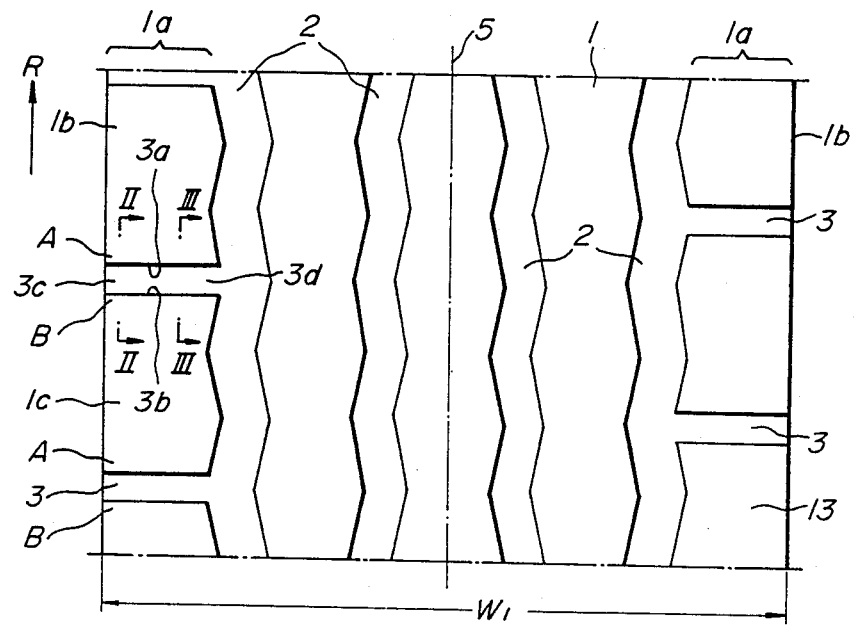
FIG_2
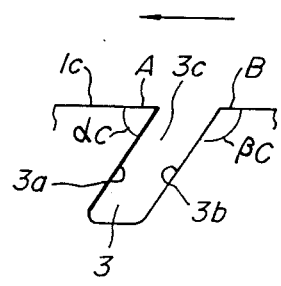
FIG_3
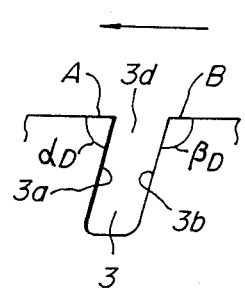

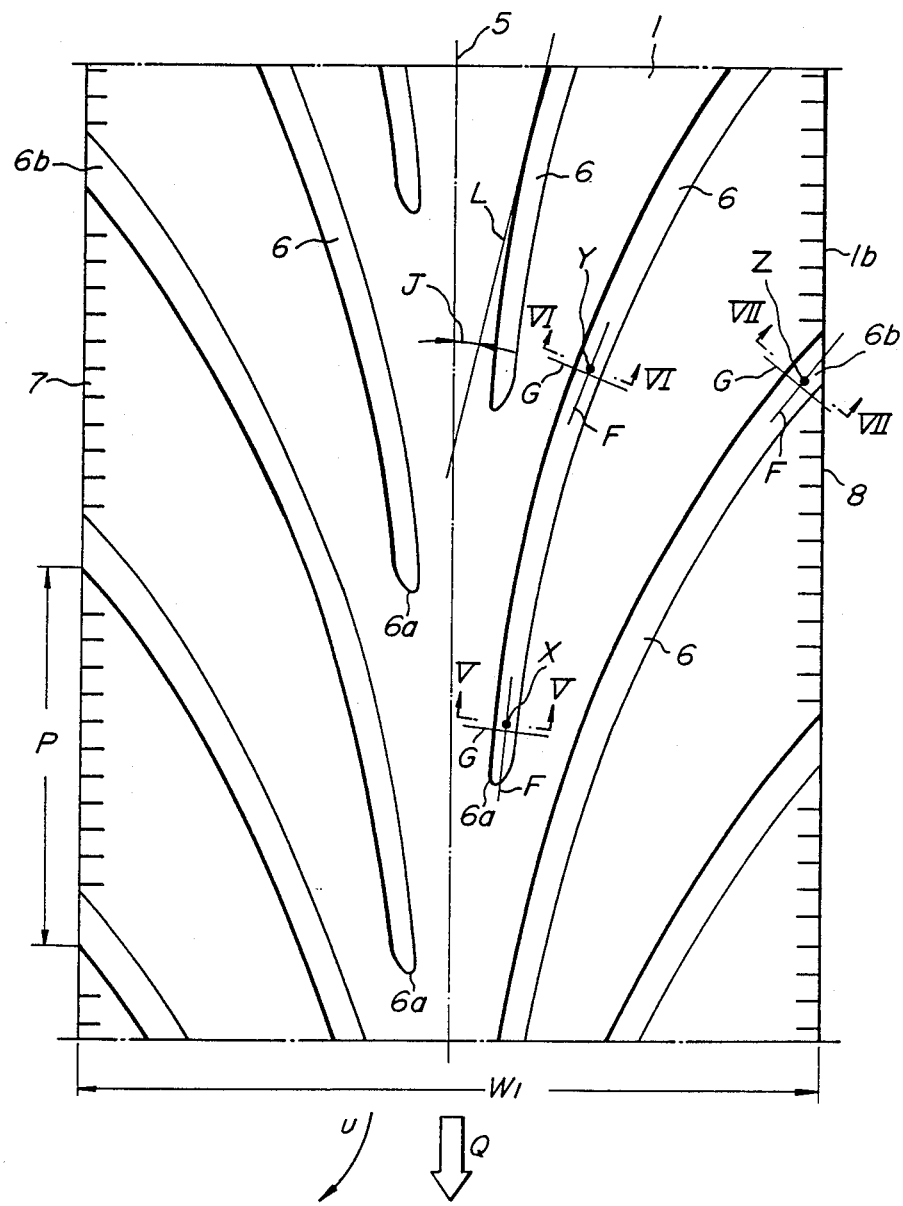
FIG_4

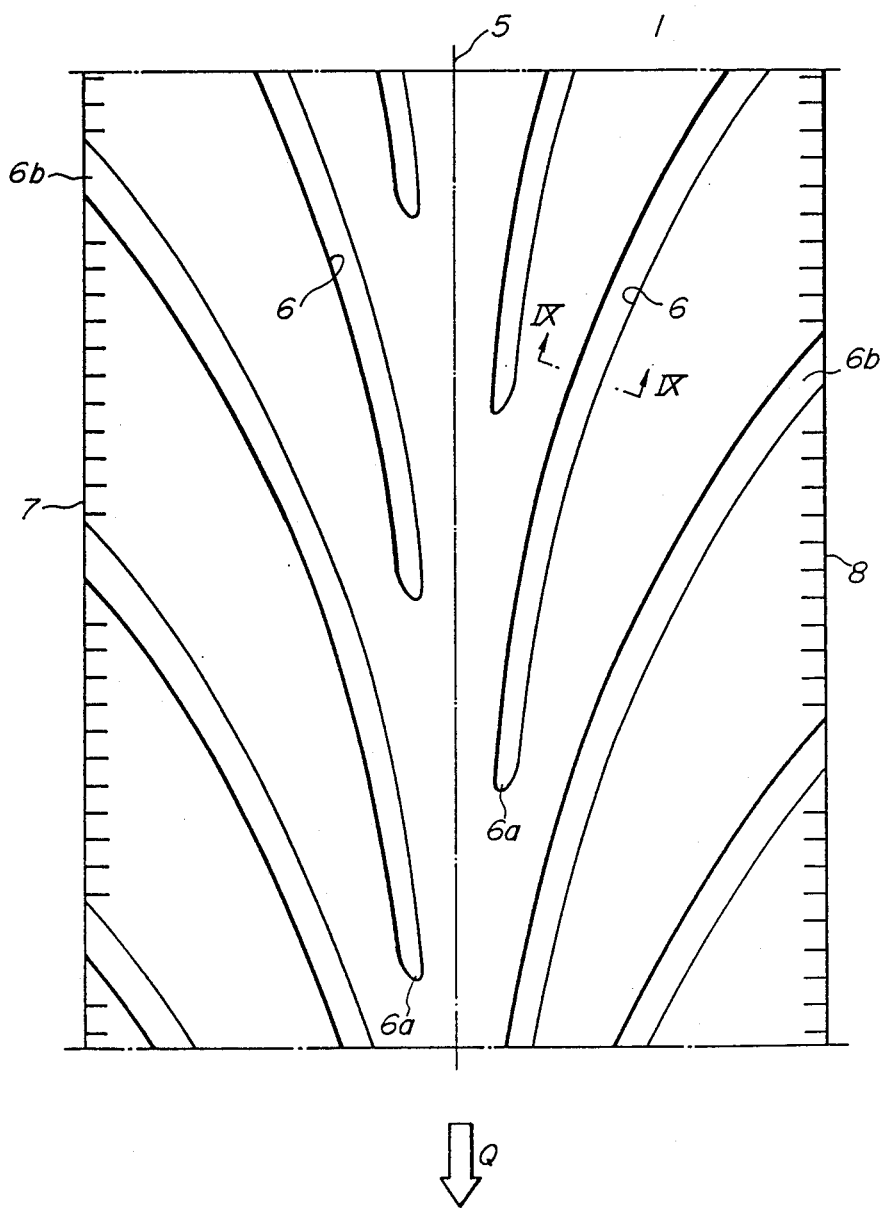
FIG_8

FIG_9
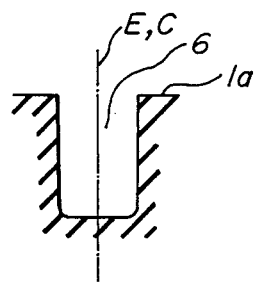
FIG_10 PRIOR ART
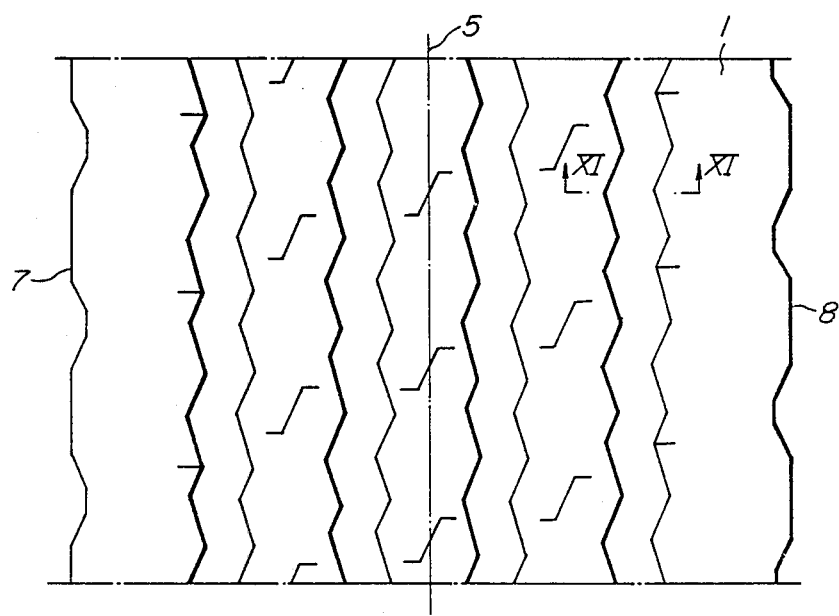

FIG_11 PRIOR ART
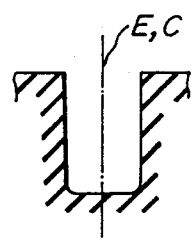
FIG_12
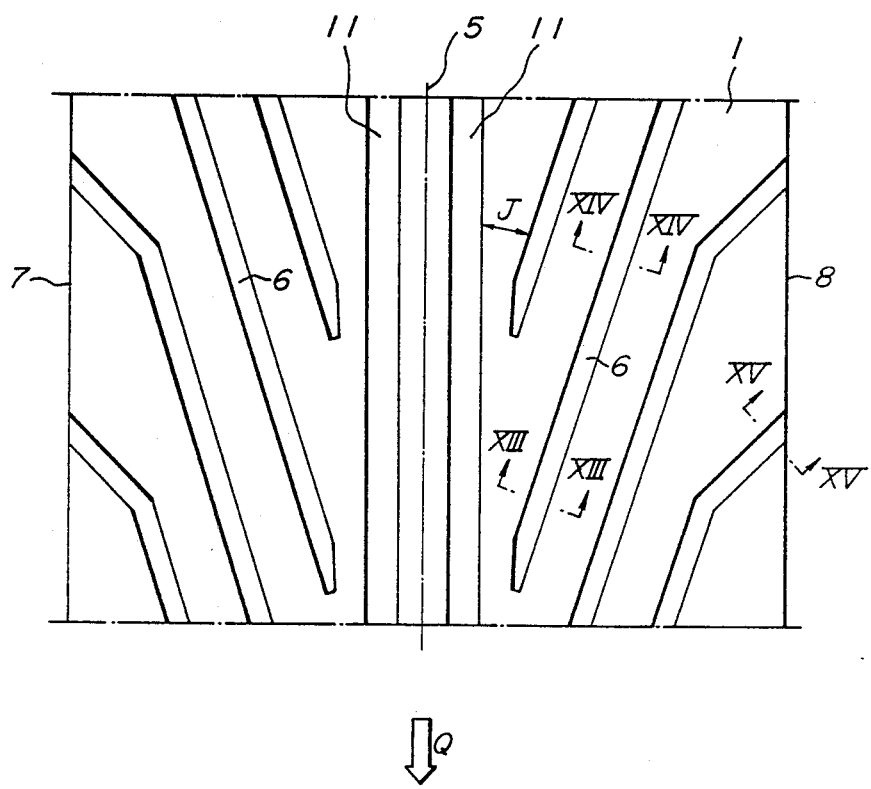

FIG_13 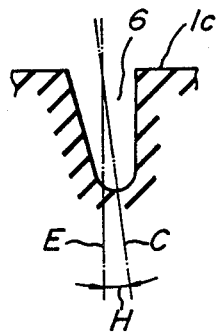
FIG_14 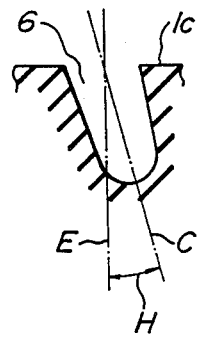
FIG_15 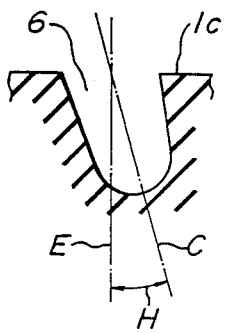

FIG_16
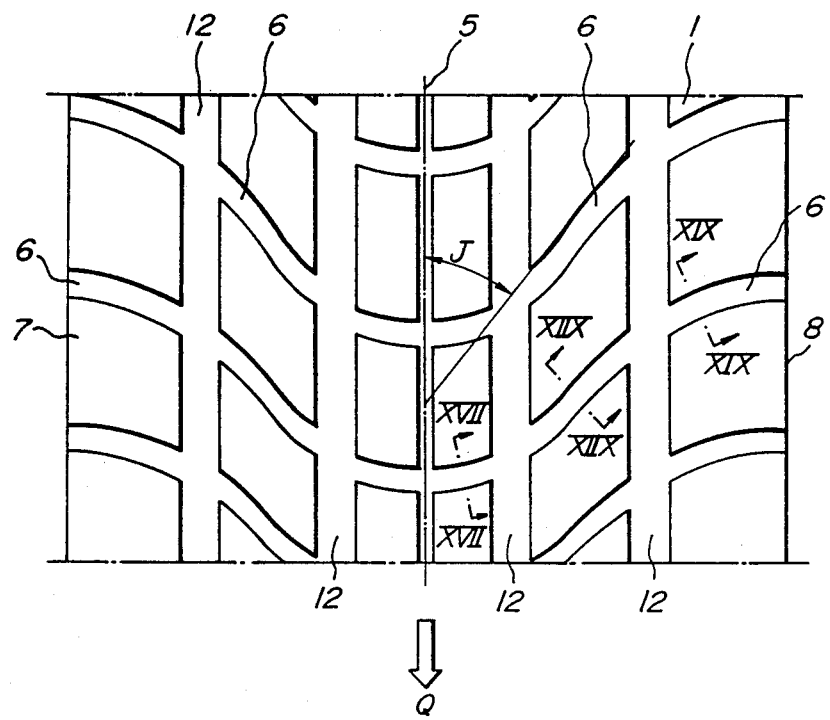

FIG_17
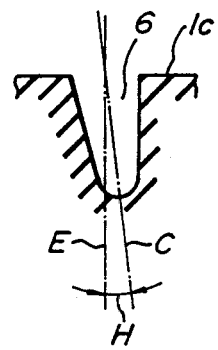
FIG_18
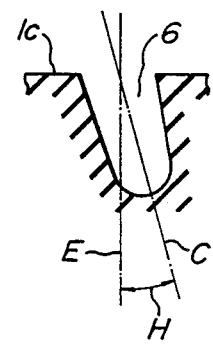
FIG_19
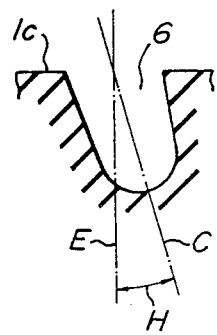

FIG_20
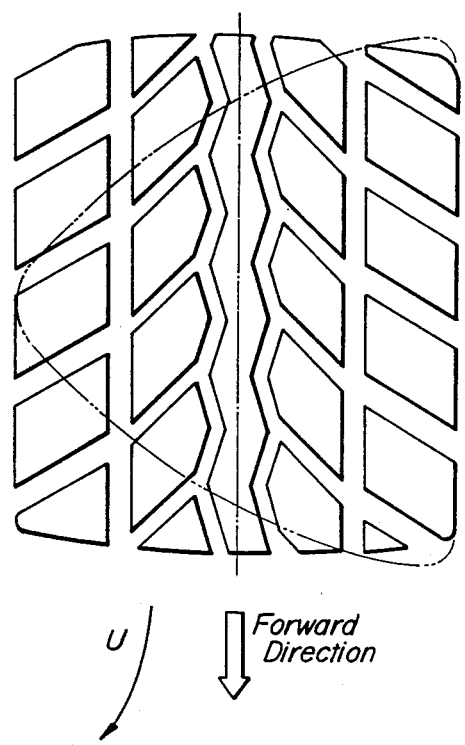

PNEUMATIC RADIAL TIRE WITH GROOVES OF VARYING CROSS SECTION

BACKGROUND OF THE INVENTION

1. Field of the Invention

This invention relates to an improvement of a pneumatic tire of a type having a tread with a number of grooves which open to the axially outer edges of the tire tread.

2. Related Art Statement

There are known different pneumatic tires of the type having a tread provided with a plurality of grooves each extending diagonally at an angle to the equatorial plane of the tire for improving the wet grip properties of the tire. Such is described in U.S. Pat. No. 4,299,264. Such a pneumatic tire has a plurality of lateral main grooves circumferentially spaced-apart from each other and formed in each side of the equatorial plane or the center line of the tread.

Each lateral main groove is diagonally arranged with respect to the equatorial plane and directed forward forwards in the rotational direction as the main groove approaches the equatorial plane and the axially outermost end of every groove is extended and open to the axially outer edge of the tire tread. As a result, when such a pneumatic tire runs on a wet road, the main grooves serve as passages for draining water between the contacted surfaces of tire tread and the road to improve the wet grip properties of the tire. Such a pneumatic tire is subjected to an axial centrifugal force and is largely deformed when a vehicle turns to the right as shown by the arrow "U" during forward movement of the vehicle and consequently a foot print thereof varies from approximately rectangular shape as shown by the solid line tread portion during a straight drive to substantially a triangular shape as shown by a triangular shape as shown by a chain and dot line in FIG. 20. Thereby a ground contact area i.e. grip area on the turning outside i.e. the outside portion with respect to the equatorial plane with respect to the turning direction of the vehicle remarkably decreases while the ground contact area slightly increases at the inside of equator plane. Thus, the turning performance of the tire substantially depends on the grip area at the outside of equator plane, in particular in the edge portion of the tread when the vehicle turns.

However, in the pneumatic tire of aforementioned type, since the axial outermost end of every lateral groove extends to the tread edge, the rigidity in the tread edge portion decreases larger than that of a conventional tire of rib type and accordingly the ground contact area of the tread remarkably decreases when the tire is subjected to a lateral force. Therefore, the pneumatic tire of aforementioned type has a low cornering performance.

SUMMARY OF THE INVENTION

It is an object of the present invention to provide an improved pneumatic tire of aforementioned type having a high cornering performance as well as a high wandering performance and a wear resistivity.

The present invention provides a pneumatic tire comprising a tread with a plurality of grooves which open to the axially outer edge or edges of the tread. The center line in a cross section of each of the grooves, at least in the tread edge portion, is axially inwardly inclined with respect to a vertical line perpendicular to the surface of the tread and the angle "H" between the center line and the vertical line is gradually increased as the position of the cross section is away from the equator plane of the tire.

Preferably, the plurality of grooves are provided on the surface of the tread on both sides of the equatorial plane, are circumferentially spaced apart from each other, are inclined with respect to the equatorial plane as to direct forward in the direction of rotation of the tire as the grooves approach to the equatorial plane and are open at the axially outermost end thereof to the tread edge.

In a preferable embodiment of the present invention, a plurality of main grooves consist of grooves being circumferentially spaced apart from each other on the surface of the tread portion and being inclined with respect to the equatorial plane so as to direct forwards in the direction of rotation of the tire as the grooves approach to the equator plane. A crossed angle "J" of the tangent line of the main groove and the equatorial plane is increased as the main groove is away from the equatorial plane.

Another preferable embodiment of the present invention provides a pneumatic tire comprising a plurality of grooves, each of which opens at the axially outermost end thereof to the tread edge, a groove side wall angle of side wall at kicking-out side "A" at least at the open end of the groove which side precedingly contacts the road surface during rotation of the tire under load being smaller than the opposite groove side wall angle of the opposite groove side wall at the stepping-in side "B" and being increased as it is away from the open end and toward the axially inner portion of the tread. When the vehicle turns during forward movement, the pneumatic tire is subjected to a centrifugal force to deform in the lateral direction and results in that the ground contact area is slightly increased in the outside of turning direction of the vehicle, but is largely decreased in the inside thereof.

In the pneumatic tire of the aforementioned type wherein the axial outermost end of the every main groove extends to the outer edge of the tread, the ground contact area at a portion adjacent to the tread outer edge in the outside of the equator plane is smaller than that of the conventional pneumatic tire of the rib type. According to the present invention, however, every main groove is inclined with respect to the equatorial plane so as to direct forward in the rotational direction of the tire as the main groove approaches to the equatorial plane and the center line in the cross section of every main groove is inclined inwardly in the axial direction relative to a vertical line normal to the surface or the tread at the tread edge portion. Accordingly, when the vehicle turns, every main groove in the outside of the equator plane deforms so that the center line of the main groove inclines so as to direct further inwardly in the axial direction, thereby to push out the open portion of the side wall of the main groove at the side of the equatorial plane so as to contact the ground surface. Thus, the ground contact area is increased to improve the cornering performance. A large area increasing effect is obtainable by increasing the ground contact area in the tread edge portion of the turning outside, where the ground contact area is essentially large.

One of problems of steering performance generally noted in the pneumatic tire is so called wandering phenomenon. This phenomenon is such that any desired directional control of the vehicle is difficult to maintain when the vehicle is driven along a straight line on or over an inclined surface of a rut, which is in the form of sinking, wearing or the like occurred on a heavily traveled paved road by heavy trucks or the other.

According to the present invention, for the purpose of improving the wandering phenomenon of a pneumatic tire, as shown in FIG. 1, having a tread 1 provided at the central portion with a plurality of circumferential grooves 2 and at the opposite edge portions 1a with a plurality of lateral grooves 3 which open to the side face 1b of the tread 1 at the outermost end thereof. Each of the lateral grooves 3 may be formed as shown in FIG. 2 to incline a side wall 3a to the surface 1c on the kicking-out side "A" at angle α which is smaller than the inclined angle β of a groove side wall 3b on the stepping-in side "B" and thereby to increase a circumferential shearing force (a braking force) on the kicking-out side "A" upon rolling of the tire under a load and thus to generate an upward moment necessary for climbing on the inclined surface of the rut. It is noted that the term of kicking-out side "A" represents a region of the tread surface 1c at one side of the lateral groove 3, which precedingly contacts the surface of the road in the direction "R" of rotation of the tire and the term of stepping-in side "B" represents a region of the tread surface 1c at the opposite side of the lateral groove 3. It is also noted that the term of the groove side wall angle represents an angle between the tread surface 1c and each of the opposite side walls 3a and 3b of the lateral groove 3 in a section perpendicular to the rotational axis of the tire. These terms are also used herein for the same definition as aforementioned.

In order to generate a large moment based on the shearing force sufficient to suppress effectively the wandering phenomenon, it is more desirable that a large shearing force is generated at the axially outer side of the tread rather than the axially inner side thereof, since the shearing force generated at the inner side of the tread has less contribution to the moment. According to the present invention, at the outermost side of the tread, i.e., at the outermost end of the lateral groove which opens to the tread side face, the groove side wall angle at the kicking-out side of the lateral groove is smaller than the groove side wall angle at the stepping-in side of the lateral groove, so that a large circumferential shearing force sufficient to generate a moment in a direction for climbing on the inclined surface of the rut can be generated to effectively prevent the wandering phenomenon, while at the axial inner side which has less contribution to the moment and therefore the wandering, the groove side wall angle at the kicking-out side is large so that the shearing force at the axially inner side is decreased to effectively suppress the heel and toe wear.

These and other objects, features and advantages of the invention will be well appreciated upon reading of the following description of the invention when taken in conjunction with the attached drawings with understanding that some modifications, variations, and changes of the same could be easily done by the skilled in the art to which the invention pertains without departing from the spirit of the invention or the scope of the claims appended hereto.

BRIEF DESCRIPTION OF THE DRAWINGS

FIG. 1 is a plan view of the surface of the tread portion of the tire showing an embodiment of the present invention;

FIG. 2 is a diagrammatic sectional view taken along line II—II of FIG. 1;

FIG. 3 is a diagrammatic sectional view taken along line III—III of FIG. 1;

FIG. 4 is a plan view of the surface of the tread portion of another embodiment of the present invention;

FIG. 8 is a plan view of the surface of the tread portion of comparative tire used in test;

FIG. 9 is a diagrammatic sectional view taken along line IX—IX of FIG. 8;

FIG. 10 is a plan view of the surface of the tread portion of conventional tire used in test;

FIG. 11 is a diagrammatic sectional view taken along line XI—XI of FIG. 10;

FIG. 12 is a plan view of the surface of the tread portion of another embodiment of the present invention;

FIG. 13 is a diagrammatic sectional view taken along line XIII—XIII of FIG. 12;

FIG. 14 is a diagrammatic sectional view taken along line XIV—XIV of FIG. 12;

FIG. 15 is a diagrammatic sectional view taken along line X V—X V of FIG. 12;

FIG. 16 is a plan view of the surface of the tread portion of another embodiment of the present invention;

FIG. 17 is a diagrammatic sectional view taken along line XVII—XVII of FIG. 16;

FIG. 18 is a diagrammatic sectional view taken along line XVIII—XVIII of FIG. 16;

FIG. 19 is a diagrammatic sectional view taken along line XIX—XIX of FIG. 16; and FIG. 20 is an explanatory view showing foot prints of conventional tire during straight movement and turning movement to right.

DESCRIPTION OF THE PREFERRED EMBODIMENT

The first embodiment according to the present invention will be described by referring to FIGS. 4–7.

FIG. 4 shows a tread of a pneumatic tire for using in truck, bus or the like. The tread 1 comprises two tread portions which are located respectively in both sides of the equatorial plane 5 and are provided at the surface 1c thereof with a plurality of main grooves 6 spaced apart by an equal pitch from each other in the circumferential direction. The main grooves 6 in both sides of the equatorial plane 5 are shifted from each other by a half pitch and are symmetrically arranged in respect to the equator plane 5.

Figure 5:
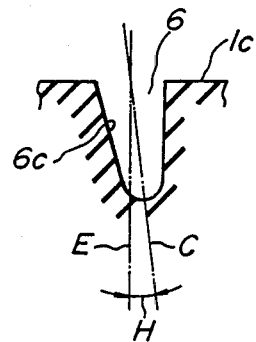
FIG. 5 is a diagrammatic sectional view taken along line V—V of FIG. 4.
Figure 6:
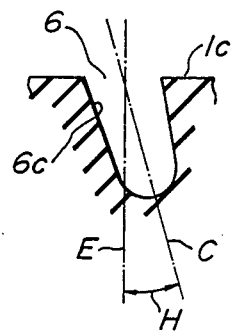
FIG. 6 is a diagrammatic sectional view taken along line VI—VI of Fig. 4.
Figure 7:
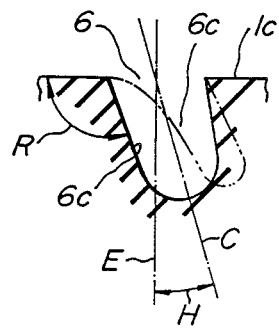
FIG. 7 is a diagrammatic sectional view taken along line VII—VII of FIG. 4.

Referring to FIGS. 4, 5, 6 and 7, at the outermost end portion 60 of the main grooves 6 adjacent to tread edges 7 and 8, the center line "C" in the cross section of each of the main grooves is inclined axially innerwardly from a vertical line "E" perpendicular to the surface 3 of the tread 1 as shown in FIG. 7. Such an arrangement that the center line "C" of the main groove at the end portion adjacent to the tread edges 7, 8 is certainly inclined to provide a large area increasing effect under cornering condition. This occurs since the tread edge regions adjacent to the tread edges 7 and 8 essentially have a larger ground contacting area than other tread regions and the ground contacting area increases at a constant rate. It is noted that the center line "C" in the section of the main groove 6 is a line extending along the center of width in the cross section of the main groove taken along a plane "G" which is perpendicular to the surface of the tread 1 at any point of the main groove 6 and transverse to the longitudinal direction F of the main groove 6.

The angle "H" between the center line "C" and the vertical line "E" is progressively increased as the main groove goes away from the equator plane 2 since if the angle H is large at the tread region adjacent to the equator plane 5, the rigidity of the tread at the region adjacent to the equatorial plane 5 decreases to produce uneven wear.

The inclination of the center line is preferably applied to the portions of each main groove 6 of at least 30% of the tread width of each tread region away from the tread edges 7 and 8 thereof, respectively, and may be applied to the whole length of each main groove.

Each main groove 6 substantially extends in the circumferential direction and also diagonally extends across the whole width of each tread portion such that the axially inner end of each main groove 6 positioned closely to the equatorial plane 5 is directed forwards in the direction of rotation "Q" of the tire (a direction that the ground contact is led when the tire is forwardly rotated). That is the direction of rotation of the tire according to this first embodiment is provided by a tread pattern. As the result in that when the tire is rotated in the normal direction, the axially innermost end of the main groove 6 which is initially stepped in is a beginning end 6a and the axially outermost end of the main groove which is finally stepped out is a terminal end 6b. A crossed angle "J" of the tangent lines L of the main groove 6 and the equatorial plane 5 is continuously and gradually increased from minimum at the beginning end 6a to maximum at the terminal end 6b so that the inclination of the main groove 6 with respect to the equatorial plane 5 becomes larger as going away from the beginning end 6a of the main groove 6 and to the terminal end 6b. The width of the main groove 6 is also increased as going away from the beginning end 6a and to the internal end 6b which is open to each tread edge 7 or 8.

The crossed angle "J" is preferably in a range of 0° ~ 60° at any point between the beginning end 6a and the terminal end 6b. The reason is that if the crossed angle "J" is less than 0°, an L-shaped bent portion exists in the main groove 6 so that water flow in the main groove 6 is difficult. When the crossed angle "J" is not less than 0°, each main groove 6 does not bend to a zigzag shape. While if the crossed angle "J" is more than 60°, the wet stability may be decreased. It can be understood that when the crossed angle "J" is in the preferable range, the water within the ground contact area can flow at high speed in the main grooves and is dispersed in the shape of fan to be quickly discharged from a contact area. As the result, an amount of water in the front of the stepping-in position decreases to increase the ground contact area of the tire nd thereby to improve the wet performance.

It is also preferable that in the tread outer edges 7 and 8 the circumferential distance or pitch "P" between the adjacent main grooves 6 is in a range of 0.2 ~ 1.0 time of the width of the tread 1. The reason is that if the distance is less than 0.2 times of the width of the tread 1, abnormally large heel and toe wear occurs at the tread edges 7 and 8. If the distance exceeds 1.0 times the width of the tread, the density of the main grooves too decreases to maintain desired drainage. Furthermore, it is preferable that such a tire has a negative ratio of at most 25%. Because if the negative ratio exceeds 25%, there are possibilities of deteriorating the wear resistance and rolling resistance of the tire. The negative ratio means a value expressing a total area of main grooves located in a unit area of tread 1 by a percentage.

The function and effect of the first embodiment of the present invention will now be described.

Now, when the vehicle such as truck, bus or the like with the tires as aforementioned turns to the right during advance in the direction shown by an arrow "Q", every tire is subjected to a large centrifugal force to cause a ground contacting portion of the tire to deform laterally. Each of the main grooves 6 located in the outer side of cornering with respect to the equatorial plane 5 is deformed so as to further incline the center line "C" in the cross section toward the axially inner side. In this embodiment, each of the main grooves 6 is inclined with respect to the equatorial plane 5 so as to direct forward in the direction of rotation of the tire as the main groove 6 approaches to the equatorial plane 5 and the center line "C" in the cross section of each of, the main grooves 6 is inclined axially inner inwardly with respect to the vertical line "E" perpendicular to the surface of at least a portion of the tread adjacent to the tread edges 7 and 8. Accordingly, in the portion of the main groove 6 being inclined with respect to the equatorial plane, the angle "R" between the side wall 6c near the equatorial plane 5 and the surface 1c of a tread 1 is an obtuse angle of at least 90°. These side walls 6c of the main grooves 6 are therefore pushed out as shown by a phantom line in FIG. 7 to cause a portion of the side wall 6c adjacent to the opening edge of the main groove to contact the road surface. As a result, the ground contact surface of the tread is increased so as to make up for a loss of the ground contact area owing to provide the main groove 6 in the surface of the tread and thereby to improve the cornering performance. The foot print varies as the result of the lateral deformation of the tire as aforementioned, the increasing of the ground contact area as mentioned above is arisen on at least a portion adjacent to the tread edges 7 and 8 of large ground contact area so that the effect of increasing the ground contact area is large.

The invention will be now described by examples of tests. For these tests, test tires have been prepared according to the present invention, as shown in FIGS. 4, 5, 6 and 7. Comparative tires have main grooves each center line "C" in the cross section thereof being parallel to the vertical line "E", i.e., the angle "H" being 0° as shown in FIGS. 8 and 9 and prior art tires of rib type generally used (center line "C" in the cross section of groove is parallel to the vertical line "E") as shown in FIGS. 10 and 11. Each of these tires has a size of 275/70R 22.5. Each of the test tires according to the present invention is provided with main grooves 6 having angle "H" between the center line "C" and the vertical line "E", at points X, Y and Z were 7.63°, 15.12° and 15.12°, respectively. The test tires were mounted to trucks under no load and then were pumped up to the correct inner pressures. The test driver used each of the trucks to turn it at highest speed on a wet road by keeping a constant cornering radius. Lateral force was determined in such a manner that the measured highest speed is squared and then divided by the cornering radius. The ratio of lateral force to gravitational acceleration of the test tire of the present invention was 0.307. The lateral forces of the comparative and prior art tires are 112 and 109, respectively. It can be understood from the above that the lateral force of the test tire is higher than that of the comparative tire as well as that of the prior tire and the cornering performance of the test tire was improved.

FIGS. 12, 13, 14 and 15 show another embodiment according to the present invention. In this embodiment, the tread 1 is provided at both sides of the equatorial plane 5 with respective circumferential main grooves 11, 11 each of which circumferentially extends without crossing with the main grooves 6 which are straightly extended and bent between the beginning end 6a and the terminal end 6b so as to increase the crossed angle "J" in stepwise.

FIGS. 16, 17, 18 and 19 show another embodiment according to the present invention. In this embodiment, the tread 1 is provided at both sides of the equatorial plane 5 with a plurality of circumferential main grooves 12, 12 which are extended in the circumferential direction and crossed with the main groove 6. The crossed angle between the main groove 6 and the equatorial plane 5 is large in both portions adjacent to the equatorial plane 5 and to the tread edges 7 and 8, while is small in the intermediate portion.

FIGS. 1, 2 and 3 show second embodiment of a heavy loading pneumatic radial tire according to the present invention.

Referring to FIG. 1, in the tread 1 of pneumatic tire (in this embodiment, the width $W_1$ of the tread is 180 mm), there are arranged four circumferential grooves 2 and a plurality of lateral grooves 3 which extend in the axial direction and space apart circumferentially from each other in both outer edge regions 1a of the tread 1 so as to form lands 13 of rib and block pattern. Each lateral groove opens to the tread side face 1b at the axially outermost end thereof.

When the pneumatic tire having such a tread 1 is rolled on a road in a direction "R" as shown in FIG. 1 under a load, the kicking-out side "A" of the land at one side of the lateral groove 3 precedingly contacts the surface of the road and the stepping-in side "B" of the land subsequently contacts the surface of the road. The groove side wall 3a at the kicking-out side "A" is inclined by a groove side wall angle $\alpha_c$ (of 70° in this embodiment) at the open end 3c of the groove 3 on the tread edge face 1b. This groove side wall angle $\alpha_c$ at the open end 3c is smaller by an angle of 40° than the opposite groove side wall angle $\beta_c$ (110°) of the opposite groove side wall 3b at the stepping-in side "B". Furthermore, the groove side wall angle $\alpha$ of the groove side wall 3a at the kicking-out side "A" is increased as the position of the side wall is away from the open end 3c towards the tire equator plane 5 along the lateral groove 3. For example, the groove side wall angle $\alpha_D$ (80°) at the kicking-out side "A" in a position 3d axially inwards away from the open end 3c by 35 mm is larger by an angle of 10° than the groove side wall angle $\alpha_c$ (80°) at the kicking-out side "A" of the open end 3c of the lateral groove 3 and the side wall angle $\alpha$ gradually varies between the groove position 3d and the open end 3c of the lateral groove 3. The cross section of the lateral groove at the groove position 3d is shown in FIG. 3. In this embodiment, the groove side wall angle $\beta$ at the stepping-in side "B" also gradually varies (decreases) from the open end 3c of the lateral groove toward the inner portion of the tread so that the angle $\beta_D$ at the position 3d is 100°. Therefore, the groove side wall angle $\alpha_D$ (80°) at the kicking-out side "A" in the groove position 3d is smaller by an angle of 20° than the groove side wall angle $\beta_D$ (100°) at the stepping-in side "B" in the same position. The construction of the tire except the aforementioned arrangement of the tread is the same as that of usual heavy loading pneumatic radial tire.

It should be understood that in the second embodiment, the tread of rib and block type has been described, but the present invention can be applied for any type of tread such as block pattern, lug pattern, rib and lug pattern so far as the lateral grooves are arranged in the edge portion of the tread.

It is preferable that the difference of the groove side wall angles at the stepping-in side and the kicking-out side ($\beta_c - \alpha_c$) is at least 10°, more particularly at least 30°. It is noted that the range of the groove side wall angles $\alpha_c$ and $\beta_c$ at the open end of the lateral groove is firstly considered for purpose of preventing the wandering phenomenon and furthermore is secondarily considered from problems in manufacturing and excessive heel and toe wearing.

Furthermore, it is preferable that the rate of variation of the groove side wall angle $\alpha$ at the kicking-out side "A" along the lateral groove (for example from $\alpha_c$ to $\alpha_d$) is about 3°~15° to a length of 10% of the width of the tread and the variation of the angle may be made stepwise, but is most preferable to vary gradually as mentioned in the above embodiments.

It is most preferable in view of balancing that the groove side wall angle $\beta$ at the stepping-in side "B" is varied (decrease) stepwise or gradually from the position of the open end 3c of the lateral groove 3 toward the axially inner portion corresponding to the groove side wall angle $\alpha$ at the kicking-out side "A" as mentioned in the above embodiment.

Furthermore, it is preferable from view of preventing effectively the wandering phenomenon that the groove side wall angle $\alpha$ at the kicking-out side is larger than the groove side wall angle $\beta$ at the stepping-in side for the all cross sections taken perpendicular to the tire rotation axis in the lateral groove 3 as well as for the open end 3c of the lateral groove 3.

In order to confirm the effect carried by the present invention, comparison tests were made by preparing three kinds of test tires having a tire size 10.00 R20 14PR (two kinds of comparative test tires and one kind of test tires according to an embodiment of the present invention).

The test tires of the present invention according to the embodiment is as shown in FIGS. 1~3 and has a conventional tire construction except the groove side wall angle. The comparative tire (1) is a conventional tire and the comparative tire (2) is modified to incline uniformly the groove side wall, but not varies in accordance to position of the side wall.

Those test tires are manufactured in the same manner except the groove side wall angle shown in the following table.

The test was carried out in a usual test manner by attaching the test tires to a test vehicle. The test results are represented by an index on a basis that the comparative example 1 is 100. The smaller value represented by an index shows better result. The wandering test was carried by measuring force required for maintaining a steering wheel when the vehicle moves straightly on an inclined surface of a rut. The heel and toe wearing test was carried by measuring differences of heel and toe wear that occurred in the lateral groove.

The groove side wall angles and the performance of the test tires (Test results) are shown in the following table. It is noted that the cross sections II—II and III—III in the table are shown in FIGS. 1~3.

TABLE 1

|  |  | Comparative example 1 (Conventional tire) | Comparative example 2 (Conventional tire) | Example (Present invention) |
| --- | --- | --- | --- | --- |
| Groove side wall angle in cross section II-II (°) | $\alpha_c$ | 110 | 70 | 70 |
|  | $\beta_c$ | 110 | 110 | 110 |
| Groove side wall angle in cross section III-III (°) | $\alpha_D$ | 110 | 70 | 80 |
|  | $\beta_D$ | 110 | 110 | 100 |
| Wandering phenomenon (force required for maintaining steering wheel) |  | 100 | 80 | 82 |
| Heel and toe wear (difference of wear) |  | 100 | 125 | 107 |

It can be understood from the above Table 1 that the tire according to the present invention can sufficiently attain the purpose for decreasing the wandering phenomenon and also can largely suppress uneven wear such as heel and toe wear in comparison with the Comparative examples 1 and 2.

It is evident from the above, the present invention achieves a remarkable improvement in the cornering performance and further improves the wandering performance, decreases uneven wear without suppressing performance.

What is claimed is:

1. A pneumatic radial tire comprising; a tread having a plurality of circumferentially spaced apart grooves arranged on each side of the equatorial plane of the tire, said grooves each having an opened end at the axially outer edges of the tread and a beginning end located close to the equatorial plane, each groove inclined to the equatorial plane and directed in the same circumferential direction to the open end from said beginning end in a rotating direction of the tire, each groove having a groove center line extending along a center of groove width in a cross section which is perpendicular to a longitudinal direction of the groove, the groove center line at least in the tread edge portion being inclined in an axially inward direction from the bottom of the groove to the surface of the tread with respect to a line which is perpendicular to the surface of the tread in the cross section, a groove angle between said center line and the line which is perpendicular being gradually increased as the position of the groove cross section is displaced away from the equatorial plane or the tire.

2. A pneumatic tire as claimed in claim 1, wherein a crossed angle of a tangent line of the main groove and he equatorial plane is increased with increasing distance of the main groove from the equatorial plane.

* * * * *